United States Patent
Mu

(10) Patent No.: US 10,097,753 B2
(45) Date of Patent: Oct. 9, 2018

(54) IMAGE DATA PROCESSING METHOD AND APPARATUS

(71) Applicant: Hisense Mobile Communications Technology Co., Ltd., Qingdao, Shandong (CN)

(72) Inventor: Qing Mu, Shandong (CN)

(73) Assignee: Hisense Mobile Communications Technology Co., Ltd., Qingdao, Shandong (CN)

( * ) Notice: Subject to any disclaimer, the term of this patent is extended or adjusted under 35 U.S.C. 154(b) by 59 days.

(21) Appl. No.: 14/972,314

(22) Filed: Dec. 17, 2015

(65) Prior Publication Data

US 2016/0234434 A1 Aug. 11, 2016

(30) Foreign Application Priority Data

Feb. 9, 2015 (CN) .......................... 2015 1 0066810

(51) Int. Cl.
*H04N 5/232* (2006.01)
*H04N 5/262* (2006.01)
(Continued)

(52) U.S. Cl.
CPC ... *H04N 5/23229* (2013.01); *G06F 17/30268* (2013.01); *H04N 5/2621* (2013.01); *H04N 5/272* (2013.01); *H04N 5/23293* (2013.01)

(58) Field of Classification Search
None
See application file for complete search history.

(56) References Cited

U.S. PATENT DOCUMENTS 8,160,398 B1 4/2012 Avidan et al.
8,549,420 B1 10/2013 Tibbett
(Continued)

FOREIGN PATENT DOCUMENTS

CN 101957981 A 1/2011
CN 102810199 A 12/2012
(Continued)

OTHER PUBLICATIONS

First Chinese Office Action to Chinese Application No. 201510066810.1 dated Apr. 19, 2017 along with English Translation, (13 p).

*Primary Examiner* — Mark T Monk
(74) *Attorney, Agent, or Firm* — Brinks Gilson & Lione

(57) ABSTRACT

An image data processing method and apparatus are disclosed. The method comprises: loading preview image data input by image hardware; acquiring at least one of a feature image, current time information, and geographical location information; loading at least one of the feature image, the time information, and the geographical location information in the preview image data by using a canvas category; driving the image hardware to generate target image data; and embedding at least one of the feature image, the time information, and the geographical location information into the target image data according to a first coordination location in the preview image data by using the canvas category. The present disclosure implements automatic post processing of image data without the need to open a professional image processing tool to perform post processing, thereby greatly improving the convenience of operation, reducing the threshold of operation and time.

17 Claims, 2 Drawing Sheets

(51) Int. Cl.
  *G06F 17/30*  (2006.01)
  *H04N 5/272*  (2006.01)

(56) References Cited

U.S. PATENT DOCUMENTS

| | | |
|---|---|---|
| 9,478,054 B1 | 10/2016 | Lewis et al. |
| 9,881,390 B2 | 1/2018 | Du |
| 2004/0012702 A1* | 1/2004 | Ishige .................. H04N 1/3872 348/333.12 |
| 2004/0184664 A1* | 9/2004 | Tuli .................. G06F 17/30899 382/232 |
| 2006/0037990 A1 | 2/2006 | Geise |
| 2007/0249368 A1 | 10/2007 | Bailly et al. |
| 2007/0288511 A1 | 12/2007 | Zink et al. |
| 2009/0122159 A1* | 5/2009 | Sakaue .............. H04N 5/23293 348/231.99 |
| 2009/0179915 A1* | 7/2009 | Fujinaga .............. H04N 1/3871 345/627 |
| 2009/0180713 A1 | 7/2009 | Bucha et al. |
| 2009/0290046 A1 | 11/2009 | Kita |
| 2010/0277611 A1 | 11/2010 | Holt et al. |
| 2011/0007086 A1 | 1/2011 | Kim et al. |
| 2011/0170802 A1 | 7/2011 | Liu et al. |
| 2011/0211770 A1 | 9/2011 | Wang et al. |
| 2011/0283223 A1 | 11/2011 | Vaittinen et al. |
| 2011/0292439 A1 | 12/2011 | Nagata et al. |
| 2013/0239063 A1 | 9/2013 | Ubillos et al. |
| 2013/0297206 A1 | 11/2013 | Heng et al. |
| 2013/0321461 A1 | 12/2013 | Filip |
| 2014/0066096 A1* | 3/2014 | Ko .......................... G06Q 10/08 455/456.2 |
| 2014/0104477 A1 | 4/2014 | Choi et al. |
| 2014/0300776 A1 | 10/2014 | Wu |
| 2014/0301663 A1 | 10/2014 | Livingston et al. |
| 2015/0103222 A1 | 4/2015 | Choi et al. |
| 2015/0170403 A1 | 6/2015 | Barcay |
| 2015/0205454 A1 | 7/2015 | Ainslie et al. |
| 2015/0242543 A1 | 8/2015 | Bailly et al. |
| 2016/0212357 A1 | 7/2016 | Cheng et al. |

FOREIGN PATENT DOCUMENTS

| | | |
|---|---|---|
| CN | 102831568 A | 12/2012 |
| EP | 2 631 756 B1 | 11/2014 |
| WO | WO 2015/163548 A1 | 10/2015 |

* cited by examiner

IMAGE DATA PROCESSING METHOD AND APPARATUS

PRIORITY STATEMENT

This application claims the priority benefit of Chinese Patent Application No. 201510066810.1 filed on Feb. 9, 2015, the disclosure of which is incorporated herein in its entirety by reference.

TECHNICAL FIELD

The present disclosure relates to the field of image data processing technologies, and in particular, to an image data processing method and an image data processing apparatus.

RELATED ART

Along with rapid development of science and technology, electronic devices are widely popular, and have an increasingly high usage in various aspects in working, learning, daily communication and the like of people. Therefore, electronic devices are an indispensable part of people's life.

A user starts an image application on an electronic device, so as to drive image hardware to make image data. When the user performs post processing on the image data, another professional image processing tool needs to be started for processing, and therefore, the operation is complicated, has a high threshold, and is very time-consuming.

SUMMARY

The present disclosure provides methods for processing image data to solve the above technical problem, so as to improve the convenience of operation, reduce the threshold of the operation, and reduce time consumption of processing.

Correspondingly, the exemplary embodiments of the present disclosure further provide an image data processing apparatus, so as to ensure implementation and application of the above method.

To solve the above problems, the exemplary embodiments of the present disclosure disclose an image data processing method, including:

loading preview image data input by image hardware;

acquiring at least one of a feature image, current time information, and geographical location information;

loading at least one of the feature image, the time information, and the geographical location information in the preview image data by using a canvas category;

driving the image hardware to generate target image data; and embedding at least one of the feature image, the time information, and the geographical location information into the target image data according to a first coordination location in the preview image data by using the canvas category.

In an exemplary embodiment, the step of acquiring at least one of a feature image, current time information, and geographical location information comprises:

extracting a feature image corresponding to a selection instruction when the selection instruction is received;

and/or, reading current time image from an operating system;

and/or, acquiring current geographical coordinate information; and searching for corresponding geographical location information corresponding to the geographical coordinate information.

In an exemplary embodiment, the step of driving the image hardware to generate target image data comprises:

driving the image hardware to generate target image data according to a first image proportion, wherein the first image proportion is different from a second image proportion of the preview image data.

In an exemplary embodiment, the step of loading at least one of the feature image, the time information, and the geographical location information in the preview image data by using a canvas category comprises:

setting a first background image by using the canvas category, the first background image comprising the preview image data; and displaying at least one of the feature image, the time information, and the geographical location information on the first background image by using the canvas category.

In an exemplary embodiment, the step of loading at least one of the feature image, the time information, and the geographical location information in the preview image data by using a canvas category further comprises:

when a touch screen event is detected, loading, by using the canvas category, at least one of the feature image, the time information, and the geographical location information at a location in the background image where the touch screen event occurs.

In an exemplary embodiment, the step of embedding at least one of the feature image, the time information, and the geographical location information into the target image data according to a first coordination location in the preview image data by using the canvas category comprises:

calculating a second coordinate location of at least one of the feature image, the time information, and the geographical location information in the target image data according to the first coordination location thereof in the preview image data; and embedding at least one of the feature image, the time information, and the geographical location information into the target image data according to the second coordination location by using the canvas category.

In an exemplary embodiment, the step of calculating a second coordinate location of at least one of the feature image, the time information, and the geographical location information in the target image data according to the first coordination location thereof in the preview image data comprises:

calculating a relative location of at least one of the feature image, the time information, and the geographical location information in the preview image data according to the first coordination location thereof in the preview image data; and calculating the second coordinate location in the target image data according to the relative location.

In an exemplary embodiment, the step of embedding at least one of the feature image, the time information, and the geographical location information into the target image data according to the second coordination location by using the canvas category comprises:

loading a second background image in a first lay by using the canvas category, the second background image comprising the target image data;

loading at least one of the feature image, the time information, and the geographical location information in a second layer by using the canvas category according to the second coordinate location; and combining the first layer and the second layer.

The exemplary embodiments of the present disclosure further disclose an image data processing apparatus, comprising:

a preview image data loading module, configured to load preview image data input by image hardware;

an information acquiring module, configured to acquire at least one of a feature image, current time information, and geographical location information;

an information loading module, configured to load at least one of the feature image, the time information, and the geographical location information in the preview image data by using a canvas category;

a target image data generating module, configured to drive the image hardware to generate target image data; and an information embedding module, configured to embed at least one of the feature image, the time information, and the geographical location information into the target image data according to a first coordination location in the preview image data by using the canvas category.

In an exemplary embodiment, the information acquiring module comprises:

an extracting sub-module, configured to extract a feature image corresponding to a selection instruction when the selection instruction is received;

and/or, a reading sub-module, configured to read current time information from an operating system;

and/or, an acquiring sub-module, configured to acquire current geographical coordinate information; and a searching sub-module, configured to search for corresponding geographical location information corresponding to the geographical coordinate information.

In an exemplary embodiment, the target image data generating module comprises:

a proportion generating sub-module, configured to drive the image hardware to generate target image data according to a first image proportion, wherein the first image proportion is different from a second image proportion of the preview image data.

In an exemplary embodiment, the information loading module comprises:

a setting sub-module, configured to set a first background image by using the canvas category, the first background image comprising the preview image data; and a displaying sub-module, configured to display at least one of the feature image, the time information, and the geographical location information on the first background image by using the canvas category.

In an exemplary embodiment, the information loading module further comprises:

a first loading sub-module, configured to: when a touch screen event is detected, load, by using the canvas category, at least one of the feature image, the time information, and the geographical location information at a location in the background image where the touch screen event occurs.

In an exemplary embodiment, the information embedding module comprises:

a location associating sub-module, configured to calculate a second coordinate location of at least one of the feature image, the time information, and the geographical location information in the target image data according to the first coordination location thereof in the preview image data; and a coordinate location embedding sub-module, configured to embed at least one of the feature image, the time information, and the geographical location information into the target image data according to the second coordination location by using the canvas category.

In an exemplary embodiment, the location associating sub-module comprises:

a relative location calculating sub-module, configured to calculate a relative location of at least one of the feature image, the time information, and the geographical location information in the preview image data according to the first coordination location thereof in the preview image data; and a coordinate location calculating sub-module, configured to calculate the second coordinate location in the target image data according to the relative location.

In an exemplary embodiment, the coordinate location embedding sub-module comprises:

a second loading sub-module, configured to load a second background image in a first lay by using the canvas category, the second background image comprising the target image data;

a third loading sub-module, configured to load at least one of the feature image, the time information, and the geographical location information in a second layer by using the canvas category according to the second coordinate location; and a compositing sub-module, configured to combine/merge the first layer and the second layer.

Compared with the prior art, the exemplary embodiments of the present disclosure comprises the following advantages:

In the exemplary embodiments of the present disclosure, at least one of a feature image, time information and geographical location information is loaded in preview image data by using a canvas category for previewing, and at least one of the feature image, the time information and the geographical location information is embedded into actually generated target image data according to a first coordinate location in the preview image data, thereby implementing automatic post processing of image data. A user does not need to open a professional image processing tool to perform post processing, thereby greatly improving the convenience of operation, reducing the threshold of operation, and reducing the time consumption of the processing.

BRIEF DESCRIPTION OF THE DRAWINGS

The disclosure will become more fully understood from the detailed description given herein below for illustration only, and thus are not limitative of the disclosure, and wherein.

DETAILED DESCRIPTION

In order that the objectives, features, and advantages of the present disclosure can be more comprehensible, the present disclosure is further described in detail through the accompanying drawings and specific implementation manners.

Figure 3:
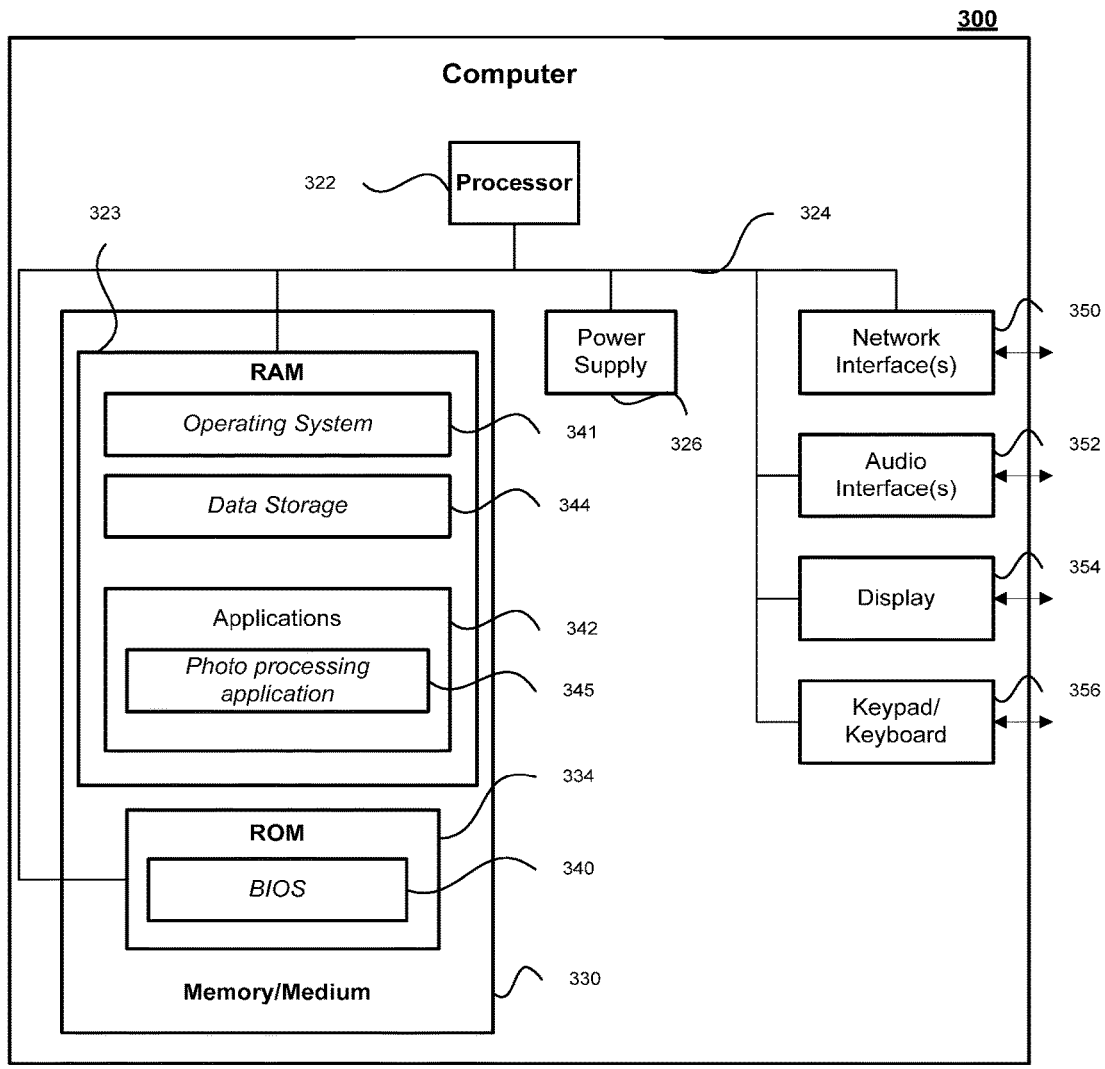
FIG. 3 is a schematic diagram illustrating an example embodiment of an apparatus embodiment for selecting target image data.

FIG. 3 is a schematic diagram illustrating an example embodiment of an apparatus embodiment for selecting target image data as introduced in the present disclosure. The apparatus may execute methods and software systems introduced in the present disclosure. An apparatus 300 may be a computing device capable of executing a software system. The apparatus 300 may, for example, be a device such as a personal desktop computer or a portable device, such as a camera, a laptop computer, a tablet computer, a cellular telephone, or a smart phone.

The apparatus 300 may vary in terms of capabilities or features. Claimed subject matter is intended to cover a wide range of potential variations. For example, the apparatus 300 may include am image processing hardware, such as a camera and/or a webcam. It may also include a keypad/keyboard 356 and a display 354, such as a liquid crystal display (LCD), or a display with a high degree of functionality, such as a touch-sensitive color 2D or 3D display. In contrast, however, as another example, a web-enabled apparatus 300 may include one or more physical or virtual keyboards, and mass storage medium 330.

The apparatus 300 may also include or may execute a variety of operating systems 341. The apparatus 300 may include or may execute a variety of possible applications 342, such as a photo processing application 345. An application 342 may enable communication with other devices via a network, such as communicating with another computer or apparatus 300 via a network.

Further, the apparatus 300 may include one or more non-transitory processor-readable storage media 330 and one or more processors 322 in communication with the non-transitory processor-readable storage media 330. For example, the non-transitory processor-readable storage media 330 may be a RAM memory, flash memory, ROM memory, EPROM memory, EEPROM memory, registers, hard disk, a removable disk, a CD-ROM, or any other form of non-transitory storage medium known in the art. The one or more non-transitory processor-readable storage media 330 may store sets of instructions, or units and/or modules that include the sets of instructions, for conducting operations and/or method steps described in the present disclosure. Alternatively, the units and/or modules may be hardware disposed in the apparatus 300 configured to conduct operations and/or method steps described in the present disclosure. The one or more processors may be configured to execute the sets of instructions and perform the methods and/or operations in example embodiments of the present disclosure.

Merely for illustration, only one processor will be described in apparatuses that execute operations and/or method steps in the following example embodiments. However, it should be note that the apparatuses in the present disclosure may also include multiple processors, thus operations and/or method steps that are performed by one processor as described in the present disclosure may also be jointly or separately performed by the multiple processors. For example, if in the present disclosure a processor of an apparatus executes both step A and step B, it should be understood that step A and step B may also be performed by two different processors jointly or separately in the apparatus (e.g., the first processor executes step A and the second processor executes step B, or the first and second processors jointly execute steps A and B).

Figure 1:
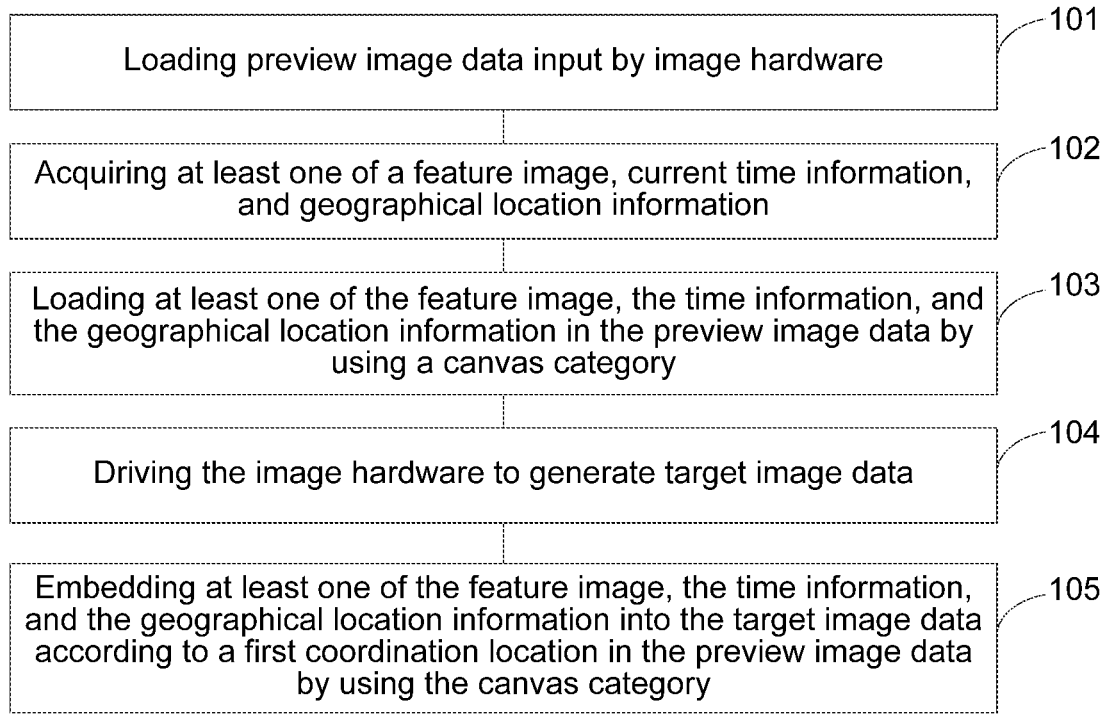
FIG. 1 is a flow chart of steps of an exemplary embodiment of an image data processing method according to the present disclosure.

FIG. 1 is a flow chart of steps of an exemplary embodiment of an image data processing method according to the present disclosure. The method may be implemented as a set of instructions and stored in the storage medium 330 of the apparatus 300. The processor 322 may execute the set of instructions to perform operations of the method. The operations may include:

Step 101: Loading preview image data input by image hardware of the apparatus.

It should be noted that, in the exemplary embodiment of the present disclosure the apparatus 300 may be an electronic device having a touch screen, such as a mobile phone, a personal digital assistant (PDA), a laptop computer, and a palmtop computer, and may also be applied to an electronic device not having a touch screen, such as a personal computer, which is not limited in the exemplary embodiment of the present disclosure.

An operating system of the mobile device may include Android, IOS, Windows Phone (WP) and the like, and generally may support running of an image application, the image application being capable of driving image hardware to generate image data.

In a specific implementation, the image hardware may have an image sensor and an optical device, the optical device can transmit optical image information to the image sensor, and the image sensor may be a sensor that can sense the optical image information and convert the optical image information into a usable output signal.

Depending on different electronic devices, the image hardware may be classified into two categories including a Charge Coupled Device (CCD) and a Complementary Metal-Oxide Semiconductor (CMOS).

The optical device may refer to a component that receives an optical object and adjusts the optical object, thereby implementing optical imaging. A lens thereof is generally a lens group formed by one or more pieces of optical glass, and a basic unit is a concave lens, a convex lens, or a combination thereof.

A principle of the image hardware obtaining the image data may be that a collected optical signal is projected to the image sensor in the image hardware, the image sensor converts the optical signal into an electric signal, and the electric signal undergoes digital quantization to obtain the image data.

The preview image data may be an image detected in the image hardware, can be written into a cache, and is not really generally image data.

Step 102: Acquiring at least one of a feature image, current time information, and geographical location information.

In the exemplary embodiment of the present disclosure, the electronic device may acquire and/or obtain target information for post processing. The target information may include at least one of the feature image, the time information in the electronic device, and the geographical location information where the electronic device is located may be acquired for post processing.

In a preferred exemplary embodiment of the present disclosure, step 102 may include the following sub-steps:

Sub-step S11: Extracting a feature image corresponding to a selection instruction when the selection instruction is received.

By applying the exemplary embodiment of the present disclosure, one or more feature images such as a sample seal and a stamp may be stored in a database.

Information, such as a name and a thumbnail, of the feature image is displayed on a user interface, and when a user clicks the information, it is equivalent to that a selection instruction is received, and a feature image corresponding to the information is extracted from the database.

In an exemplary embodiment of the present disclosure, step 102 may include the following sub-steps:

Sub-step S12: Reading current time information from an operating system.

The time information may include year, month, day, hour, minute, second, and the like.

In the exemplary embodiment of the present disclosure, a time acquiring function provided by the operating system may be called, so as to read current time information from the operating system.

For example, a Calendar category may be called in an Android system to acquire current time information:

final Calendar c=Calendar.getInstance( );
mYear=c.get(Calendar.YEAR); // acquiring the current year
mMonth=c.get(Calendar.MONTH); // acquiring the current month
mDay=c.get(Calendar.DAY_OF_MONTH); // acquiring a day number of the current month
mHour=c.get(Calendar.HOUR_OF_DAY); // acquiring current hour number
mMinute=c.get(Calendar.MINUTE); // acquiring current minute number In the exemplary embodiment of the present disclosure, to avoid excessively large amount of time information, the year, month and day may be extracted. The hour, minute, second and the like may also be extracted continuously if it is required by the user, which is not limited in the exemplary embodiment of the present disclosure.

In an exemplary embodiment of the present disclosure, step 102 may include the following sub-steps:

Sub-step S13: Acquiring current geographical coordinate information.

In a specific implementation, the current electronic device may acquire the current geographical coordinate information by using a manner such as a satellite positioning, a wireless fidelity (WIFI) positioning, a base station positioning, a cell identity (ID) positioning, and an Advanced Forward-Link Triangulation (AFLT) positioning.

The satellite positioning may send a location signal of a terminal to a positioning background for positioning. Currently available satellite positioning systems include the GPS, the GLONASS, the Beidou system, the Galileo system and the like.

The WIFI positioning may perform positioning according to the intensity of a signal sent by a WIFI hotspot deployed at every place and a global unique MAC address (Media Access Control Address, or referred to as a hardware address used to define a location of a network device).

The base station positioning may determine a location of a terminal by calculating a distance between a base station of an operator (such as a China Mobile operator, a China Unicom operator, and a China Telecom operator) and the terminal.

In the Cell ID positioning, a cell number (which may be estimated by using a serving base station) where the terminal is located may be reported by using a wireless network (for example, a cellular network), and a location service platform translates the cell number into latitude/longitude coordinates.

When a positioning operation is performed by using the AFLT, the terminal monitors pilot information of multiple base stations (at least 3 base stations) at the same time, a distance from the terminal to a nearby base station is determined by using a chip delay, and finally a location of the terminal is calculated by using a triangulation positioning method.

By using the GPS as an example, a GPRMC format example of acquired GPS data may be shown as follows:

$GPRMC,<1>,<2>,<3>,<4>,<5>,<6>,<7>,<8>,<9>, <10>,<11>,<12>;

where, the field <1> is a Universal Time Coordinated time (UTC time), and a format thereof may be: hhmmss.sss; the field <2> is a positioning state, including A=data available, and V=data unavailable; the field <3> is the latitude, and a format thereof may be: ddmm.mmmm; the field <4> is the latitude classification, including the Northern Hemisphere (N) or the Southern Hemisphere (S); the field <5> is the longitude, and a format thereof may be: ddmm.mmmm; the field <6> is the longitude classification, including the Eastern (E) Hemisphere or the Western (W) Hemisphere; the field <7> is the relative displacement speed, including 0.0 to 1851.8 knots; the field <8> is the relative displacement direction, including 000.0 to 359.9 degrees; the field <9> is the date, and a format thereof may be: ddmmyy; the field <10> is the magnetic declination, including 000.0°-180.0°; the field <11> is the magnetic declination direction, including E (east) or W (west); and the field <12> is the Checksum.

In this example, the geographical coordinate information may include the latitude, the latitude classification, the longitude, and the longitude classification.

Sub-step S14: Searching for corresponding geographical location information corresponding to the geographical coordinate information.

In the exemplary embodiment of the present disclosure, the geographical location information corresponding to the geographical coordinate information may be searched for through a server in the cloud or through Internet, and the server may provide a geographical location identification service and provides an API (Application Program Interface) interface for another electronic device to call the geographical location identification service.

The electronic device may encapsulate and/or include the geographical coordinate information as a parameter into a request according to the specification of the API interface, and send the request to the server to call the geographical location identification service.

In the server, the geographical location information corresponding to the geographical coordinate information may be identified through an inverse geographical coding.

The inverse geographical coding is referred to with respect to a geographical coding.

The geographical coding service refers to conversion from known geographical location information into corresponding geographical coordinate information (such as longitude/latitude coordinates), that is, geographical coordinate information (such as longitude/latitude coordinates) corresponding to the address is searched for according to the geographical location information.

The inverse geographical coding may be an address analysis service, and specifically refers to a service for converting the known geographical coordinate information (such as longitude/latitude coordinates) to the corresponding geographical location information (such as a room number, a floor number, a street name, and names of the city and province).

If the server analyzes the geographical location information corresponding to the geographical coordinate information, the geographical location information may be returned to the current electronic device.

Step 103: Loading at least one of the feature image, the time information, and the geographical location information in the preview image data by using a canvas category.

In a specific implementation, the canvas category may provide a drawing method, and may draw a basic graph on a bitmap at the bottom layer.

In the Android system, the Canvas may be used as a canvas for painting, and an object required, such as the feature image, the current time information and the geographical location information, may be drawn on the canvas by using a set brush (Paint category).

In an exemplary embodiment of the present disclosure, step 103 may include the following sub-steps:

Sub-step S21: Setting a first background image by using the canvas category, wherein, the first background image may include the preview image data.

In the Android system, an example of determining the first background image of a display region may be as follows:

Canvas canvas=new Canvas(mDispPreviewImage), wherein, in the Canvas canvas category, a new blank canvas may be created, and the preview image data is set as the first background image on the blank canvas.

Sub-step S22: Displaying at least one of the feature image, the time information, and the geographical location information on the first background image by using the canvas category.

In the Android system, an example of displaying the feature image in the first background image may be as follows:

canvas.drawBitmap(mPreviewImage, src, dst, null), wherein, in the Canvas canvas category, a drawBitmap method may be used to draw a bitmap (that is, the feature image) on the canvas, the appearance of the bitmap may be changed by designating the size of the bitmap or using a matrix, thereby displaying the bitmap on the first background image.

In this example, parameters src and dst may be used to indicate the display region, and may also be used to indicate displaying of the bitmap.

In the Android system, an example of displaying the time information and the geographical location information in the first background image may be as follows:

canvas.drawText("xxx", x, y, paint), wherein, in the Canvas canvas category, a drawText method may be used to display a text (that is xxx, such as the time information and the geographical location information) to a designated location (that is, coordinates x,y).

In an actual application, the locations of the time information and the geographical location information may be in the feature image, so as to obtain a combination effect.

It should be noted that, the Canvas canvas category may further be used to set display styles of the time information and the geographical location information, such as a combination effect, a font style, and a font color. The display types may be provided by default, or may be designated by the user, which is not limited in the exemplary embodiment of the present disclosure.

In an exemplary embodiment of the present disclosure, step 103 may include the following sub-steps:

Sub-step S23: When a touch screen event is detected, loading, by using the canvas category, at least one of the feature image, the time information, and the geographical location information at a location in the background image where the touch screen event occurs.

In a specific implementation, the electronic device may detect a touch signal (for example, a touch event), such as a push down event (Down), a move event (Move), and a lift up event (UP), triggered by a slide operation of the user.

The push down event (Down) may indicate a push down without moving or lifting up, the move event (Move) may indicate a movement (or slide) after push down, and the lift up event (UP) may indicate a lift up.

The electronic device may convert the touch signal into a track point coordinate (for example, a rectangular coordinate system, that is, an X coordinate and a Y coordinate), and each track point may include time information to indicate a sliding sequence of the track point, and identification of multiple track points may indicate a slide track.

Step 104: Driving the image hardware to generate target image data.

In an actual application, an optical image of a scene generated by using a lens of the image hardware is projected to a surface of an image sensor, and is converted into an electric signal, the electric signal is converted by using A/D (analog-to-digital conversion) into a digital image signal, and the digital image signal is compressed by using a digital signal processing chip (DPS) or a coding library and then converted into a specific image file format for storage.

In an exemplary embodiment of the present disclosure, step 104 may include the following sub-steps:

Sub-step S21: Driving the image hardware to generate the target image data according to a first image proportion, wherein, the first image proportion is different from a second image proportion of the preview image data.

The image proportion (for example, the first image proportion and the second image proportion) may be size information of an image (for example, the target image data and the preview image data), for example, the aspect ratio may be 4:3, 16:9, and the like. The image proportion may be set by the user, or provided by the system by default, which is not limited in the exemplary embodiment of the present disclosure.

In the exemplary embodiment of the present disclosure, the target image data and the preview image data have different image proportions.

In the process of generating the target image data, in addition to the image proportion, the image hardware may perform processing such as focusing, setting the amount of generated image data, setting the image size, setting the color effect, setting the ISO, setting the exposure, setting the white balance, setting a saturation, setting the contrast, and setting the sharpness, which is not limited in the exemplary embodiment of the present disclosure.

Step 105: Embedding at least one of the feature image, the time information, and the geographical location information into the target image data according to a first coordination location in the preview image data by using the canvas category.

In the exemplary embodiment of the present disclosure, drawing of the target image data may be implemented by using the canvas category, so as to embed the feature image, the time information and the geographical location information therein.

In an exemplary embodiment of the present disclosure, step 105 may include the following sub-steps:

Sub-step S31: Calculating a second coordinate location of at least one of the feature image, the time information, and the geographical location information in the target image data according to the first coordination location thereof in the preview image data.

It should be noted that the coordinate location (for example, the first coordinate location and the second coordinate location) may be a real location of the feature image, the time information and the geographical location information in the image data (for example, the preview image data and the target image data), for example, the abscissa is N pixels, and the ordinate is M pixels.

The image data has various proportion sizes, such as 16:9 and 4:3, that is, the preview image data and the target image data also have various proportion sizes, which may cause that the preview image data and the target image data have different proportion sizes.

Therefore, the exemplary embodiments of the present disclosure may convert the first coordinate location of the preview image data into the second coordinate location of the target image data, so as to ensure that the feature image, the time information and the geographical location information in the target image data may keep an effect during preview.

In an exemplary embodiment of the present disclosure, sub-step S21 may include the following sub-steps:

Sub-step S211: Calculating a relative location of at least one of the feature image, the time information, and the geographical location information in the preview image data according to the first coordination location thereof in the preview image data; and Sub-step S212: Calculating the second coordinate location in the target image data according to the relative location.

In the exemplary embodiment of the present disclosure, a location of the feature image, the time information and the geographical location information relative to the preview image data (that is, a relative location) may be calculated, for example, the abscissa is 1/A length, and the ordinate is 1/B width, or the like.

The second coordinate location of the feature image, the time information and the geographical location information in the target image data is calculated according to the relative location.

Sub-step S22: Embedding at least one of the feature image, the time information, and the geographical location information into the target image data according to the second coordination location by using the canvas category.

In the exemplary embodiment of the present disclosure, the feature image, the time information and the geographical location information may implement drawing of the target image data according to the second coordinate location by using the canvas category, and the target image data is saved locally.

In an exemplary embodiment of the present disclosure, sub-step S22 may include the following sub-steps:

Sub-step S221: Loading a second background image in a first layer by using the canvas category, the second background image comprising the target image data;

Sub-step S222: Loading at least one of the feature image, the time information, and the geographical location information in a second layer by using the canvas category according to the second coordinate location; and Sub-step S223: Compositing and/or combining the first layer and the second layer.

In the specific implementation, a blank canvas (that is, the first layer) is created by using the Canvas category, and the second background image, that is, the target image data is loaded in the blank canvas by using a drawBitmap method.

An example of loading the second background image may be described as follows:

Bitmap bmps=BitmapFactory.decodeResource(getResources( ), R.drawable.playerbackground);
canvas.drawBitmap(bmps, 0, 0, null);

An object to be saved, for example, the feature image, the time information and the geographical location information, is loaded on the second layer by using the drawBitmap method of the Canvas canvas category.

An example of loading the object to be saved may be described as follows:

canvas.drawBitmap(bmp, 10, 100, null);

The first layer and the second layer are saved by using a save method of the Canvas canvas category, thereby implementing embedding of the feature image, the time information and the geographical location information in the target image data.

An example of saving the first layer and the second layer may be described as follows:

canvas.save(Canvas.ALL_SAVE_FLAG);
canvas.restore( );

A path required for saving is selected, and the target image data having the feature image, the time information and the geographical location information embedded therein is saved to the path.

An example for selecting a path for saving may be described as follows:

File file=new File("/sdcard/song/").

In the exemplary embodiments of the present disclosure, at least one of a feature image, time information and geographical location information is loaded in preview image data by using a canvas category for previewing, and at least one of the feature image, the time information and the geographical location information is embedded into actually generated target image data according to a first coordinate location in the preview image data, thereby implementing automatic post processing of image data. A user does not need to open a professional image processing tool to perform post processing, thereby greatly improving the convenience of operation, reducing the threshold of operation, and reducing the time consumption of the processing.

It should be noted that, for ease of description, the method exemplary embodiments are described as a combination of a series of actions; however, a person skilled in the art should know that the exemplary embodiments of the present disclosure are not limited by the described action sequence, this is because according to the exemplary embodiments of the present disclosure, some steps may be performed by using another sequence or performed simultaneously. Next, a person skilled in the art should also know that the exemplary embodiments described in the specification are all preferred exemplary embodiments, and involved actions are not necessary for the exemplary embodiments of the present disclosure.

Figure 2:
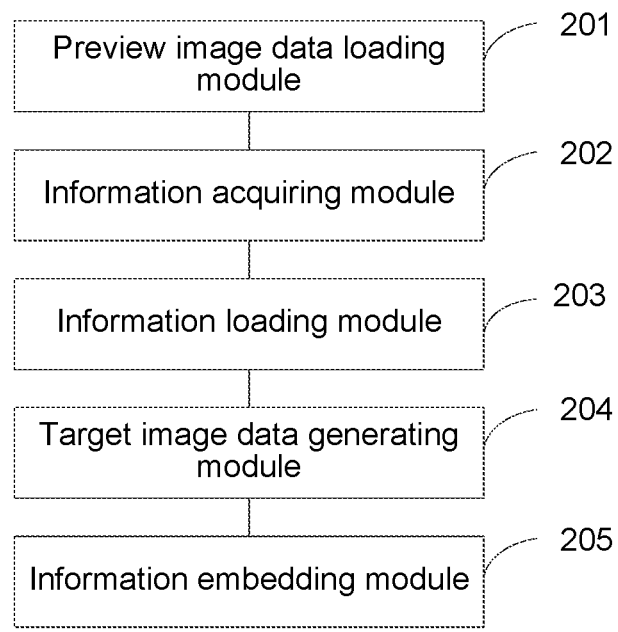
FIG. 2 is a structural block diagram of an exemplary embodiment of an image data processing apparatus according to the present disclosure.

Referring to FIG. 2, a structural block diagram of an exemplary embodiment of an image data processing apparatus according to the present disclosure is shown, and the apparatus specifically may comprise the following modules:

a preview image data loading module 201, configured to load preview image data input by image hardware;

an information acquiring module 202, configured to acquire at least one of a feature image, current time information, and geographical location information;

an information loading module 203, configured to load at least one of the feature image, the time information, and the geographical location information in the preview image data by using a canvas category;

a target image data generating module 204, configured to drive the image hardware to generate target image data; and an information embedding module 205, configured to embed at least one of the feature image, the time information, and the geographical location information into the target image data according to a first coordination location in the preview image data by using the canvas category.

In an exemplary embodiment of the present disclosure, the information acquiring module 202 may include the following sub-modules:

an extracting sub-module, configured to extract a feature image corresponding to a selection instruction when the selection instruction is received;

and/or, a reading sub-module, configured to read current time information from an operating system;

and/or, an acquiring sub-module, configured to acquire current geographical coordinate information; and a searching sub-module, configured to search for corresponding geographical location information corresponding to the geographical coordinate information.

In an exemplary embodiment of the present disclosure, the target image data generating module 204 may include the following sub-modules:

a proportion generating sub-module, configured to drive the image hardware to generate target image data according to a first image proportion, wherein the first image proportion is different from a second image proportion of the preview image data.

In an exemplary embodiment of the present disclosure, the information loading module 203 may include the following sub-modules:

a setting sub-module, configured to set a first background image by using the canvas category, the first background image comprising the preview image data; and a displaying sub-module, configured to display at least one of the feature image, the time information, and the geographical location information on the first background image by using the canvas category.

In an exemplary embodiment of the present disclosure, the information loading module 203 may further include the following sub-modules:

a first loading sub-module, configured to: when a touch screen event is detected, load, by using the canvas category, at least one of the feature image, the time information, and the geographical location information at a location in the background image where the touch screen event occurs.

In an exemplary embodiment of the present disclosure, the information embedding module 205 may include the following sub-modules:

a location associating sub-module, configured to calculate a second coordinate location of at least one of the feature image, the time information, and the geographical location information in the target image data according to the first coordination location thereof in the preview image data; and a coordinate location embedding sub-module, configured to embed at least one of the feature image, the time information, and the geographical location information into the target image data according to the second coordination location by using the canvas category.

In an exemplary embodiment of the present disclosure, the location associating sub-module may include the following sub-modules:

a relative location calculating sub-module, configured to calculate a relative location of at least one of the feature image, the time information, and the geographical location information in the preview image data according to the first coordination location thereof in the preview image data; and a coordinate location calculating sub-module, configured to calculate the second coordinate location in the target image data according to the relative location.

In an exemplary embodiment of the present disclosure, the coordinate location embedding sub-module may include the following sub-modules:

a second loading sub-module, configured to load a second background image in a first lay by using the canvas category, the second background image comprising the target image data;

a third loading sub-module, configured to load at least one of the feature image, the time information, and the geographical location information in a second layer by using the canvas category according to the second coordinate location; and a compositing sub-module, configured to combine/merge the first layer and the second layer.

The apparatus exemplary embodiment is basically similar to the method exemplary embodiment, the description thereof is rather simple, and related parts may be obtained with reference to the descriptions of the parts in the method exemplary embodiment.

The exemplary embodiments in this specification are all described in a progressive manner. Description of each of the exemplary embodiments focuses on differences from other exemplary embodiments, and reference may be made to each other for the same or similar parts among respective exemplary embodiments.

A person skilled in the art should understand that the exemplary embodiments of the present disclosure may be provided as a method, an apparatus, or a computer program product. Therefore, the exemplary embodiments of the present disclosure may use a form of a complete hardware exemplary embodiment, a complete software exemplary embodiment, or an exemplary embodiment combining software and hardware. In addition, the exemplary embodiments of the present disclosure may use a form of a computer program product implemented on one or more computer available storage media (including but not limited to a disk memory, a CD-ROM, an optical memory, and the like) including computer available program code.

The exemplary embodiments of the present disclosure are described with reference to flowcharts and/or block diagrams of the method, terminal device (system), and the computer program product in the exemplary embodiments of the present disclosure. It should be understood that computer program instructions can implement each process and/or block in the flowcharts and/or block diagrams and a combination of processes and/or blocks in the flowcharts and/or block diagrams. These computer program instructions may be provided to a general-purpose computer, a dedicated computer, an embedded processor, or a processor of another programmable data processing device to generate a machine, so that an apparatus configured to implement functions specified in one or more processes in the flowcharts and/or one or more blocks in the block diagrams is generated by using instructions executed by the general-purpose computer or the processor of another programmable data processing device.

These computer program instructions may also be stored in a computer readable memory that can guide a computer or another programmable data processing device to work in a specific manner, so that the instructions stored in the computer readable memory generate a product including an instruction apparatus, where the instruction apparatus implements functions specified in one or more processes in the flowcharts and/or one or more blocks in the block diagrams.

These computer program instructions may also be loaded into a computer or another programmable data processing device, so that a series of operation steps are performed on the computer or another programmable data processing device to generate processing implemented by a computer, and instructions executed on the computer or another programmable data processing device provide steps for implementing functions specified in one or more processes in the flowcharts and/or one or more blocks in the block diagrams.

Although the preferred exemplary embodiments of the exemplary embodiments of the present disclosure are described, a person skilled in the art can make other variations and modifications on the exemplary embodiments upon knowing a basic creative concept. Therefore, the accompanying claims intend to be explained as including the preferred exemplary embodiments and all variations and modifications falling within the scope of the exemplary embodiments of the present disclosure.

Finally, it should be noted that the relational terms herein such as first and second are used only to differentiate an entity or operation from another entity or operation, and do not require or imply any actual relationship or sequence between these entities or operations. Moreover, the terms "include", "comprise", and any variants thereof are intended to cover a non-exclusive inclusion. Therefore, in the context of a process, method, object, or device that includes a series of elements, the process, method, object, or device not only includes such elements, but also includes other elements not specified expressly, or may include inherent elements of the process, method, object, or device. Unless otherwise specified, an element limited by "include a/an . . . " does not exclude other same elements existing in the process, the method, the article, or the device that includes the element.

An image data processing method and an image data processing apparatus provided in the present disclosure are described in detail in the foregoing. The principles and implementation manners of the present disclosure are described by applying specific examples in this text, and the descriptions of the exemplary embodiments are merely intended to help understanding of the method and core ideas of the present disclosure; meanwhile, for a person of ordinary skill in the art, variations may be made on the specific implementation manners and application scopes according to the idea of the present disclosure, and therefore, the content of the specification should not be understood as limitation to the present disclosure.

The invention claimed is:

1. An electronic device, comprising:
an image sensor configured to obtaining image data;
a processor-readable storage medium including a set of instructions for image data processing; and
a processor in communication with the image sensor and the processor-readable storage medium, wherein when executing the set of instructions, the processor is directed to:
load preview image data having a first length-width ratio from the image sensor;
acquire target information including at least one of a feature image, current time information, and geographical location information of the electronic device;
load the target information in the preview image data by using a canvas category;
obtain a first coordinate location of the target information in the preview image data;
drive the image sensor to generate target image data having a second length-width ratio different from the first length-width ratio;
calculate a second coordinate location in the target image data using the canvas category and based on the first coordinate location, the first length-width ratio, and the second length-width ratio, wherein the second coordinate location is different from the first coordinate location; and
embed the target information into the target image data at the second coordinate location in the target image data by using the canvas category to generate an output image.

2. The electronic device according to claim 1, wherein to acquire the target information the processor is directed to perform at least one act of:
extracting the feature image corresponding to a selection instruction when the selection instruction is received;
reading the current time information from an operating system; and
acquiring current geographical coordinate information and obtaining the geographical location information corresponding to the current geographical coordinate information.

3. The electronic device according to claim 1, wherein the target information includes at least one of current time information and geographical location information of the electronic device.

4. The electronic device according to claim 1, wherein to load the target information in the preview image data the processor is directed to:
set a first background image by using the canvas category, the first background image comprising the preview image data; and
display the target information on the first background image by using the canvas category.

5. The electronic device according to claim 4, wherein to load the target information the processor is further directed to:
when a touch screen event is detected, load, by using the canvas category, the target information at a location in the first background image where the touch screen event occurs.

6. The electronic device according to claim 1, wherein to calculate the second coordinate location, the processor is directed to:
calculate a relative location of the target information in the preview image data according to the first coordinate location of the target information in the preview image data; and
calculate the second coordinate location of the target information in the target image data according to the relative location, the first length-width ratio, and the second length-width ratio.

7. The electronic device according to claim 1, wherein to embed the target information into the target image data at the second coordinate location, the processor is directed to:
load a second background image in a first layer by using the canvas category, the second background image comprising the target image data;
load the target information in a second layer by using the canvas category according to the second coordinate location; and
combine the first layer and the second layer.

8. A method for image data processing, comprising:
loading, by an electronic device comprising a processor-readable storage medium, an image sensor, and a processor in communication with the image sensor and the processor-readable storage medium, preview image data having a first length-width ratio from the image sensor of the electronic device;

acquiring, by the electronic device, target information including at least one of a feature image, current time information, and geographical location information of the electronic device;

loading, by the electronic device, the target information in the preview image data by using a canvas category;

obtaining a first coordinate location of the target information in the preview image data;

driving, by the electronic device, the image sensor to generate target image data having a second length-width ratio different from the first length-width ratio;

calculating a second coordinate location in the target image data using the canvas category and based on the first coordinate location, the first length-width ratio, and the second length-width ratio, wherein the second coordinate location is different from the first coordinate location; and embedding, by the electronic device, the target information into the target image data at the second coordinate location in the target image data by using the canvas category to generate an output image.

9. The method according to claim 8, wherein the acquiring of the target information comprises at least one of:

extracting the feature image corresponding to a selection instruction when the selection instruction is received;

reading the current time information from an operating system;

acquiring current geographical coordinate information and obtaining geographical location information corresponding to the current geographical coordinate information.

10. The method according to claim 8, wherein the target information includes at least one of current time information and geographical location information of the electronic device.

11. The method according to claim 8, wherein the loading of the target information in the preview image data comprises:

setting a first background image by using the canvas category, the first background image comprising the preview image data; and displaying the target information on the first background image by using the canvas category.

12. The method according to claim 11, wherein the loading of the target information further comprises:

when a touch screen event is detected, loading, by using the canvas category, the target information at a location in the first background image where the touch screen event occurs.

13. The method according to claim 8, wherein the second coordinate location of the target information in the target image data is calculated by:

calculating a relative location of the target information in the preview image data according to the first coordinate location of the target information in the preview image data; and calculating the second coordinate location of the target information in the target image data according to the relative location, the first length-width ratio, and the second length-width ratio.

14. The method according to claim 8, wherein embedding the target information into the target image data at the second coordinate location by using the canvas category comprises:

loading a second background image in a first layer by using the canvas category, the second background image comprising the target image data;

loading the target information in a second layer by using the canvas category according to the second coordinate location;

and combining the first layer and the second layer.

15. A non-transitory processor-readable storage medium, comprising a set of instructions for image data processing, wherein when executed by a processor of an electronic device in communication with an image sensor, the set of instructions directs the processor to perform acts of:

loading preview image data having a first length-width ratio from the image sensor of the electronic device;

acquiring target information including at least one of a feature image, current time information, and geographical location information of the electronic device;

loading the target information in the preview image data by using a canvas category;

obtaining a first coordinate location of the target information in the preview image data;

driving the image sensor to generate target image data having a second length-width ratio different from the first length-width ratio;

calculating a second coordinate location in the target image data using the canvas category and based on the first coordinate location, the first length-width ratio, and the second length-width ratio, wherein the second coordinate location is different from the first coordinate location; and embedding the target information into the target image data at the second coordinate location in the target image data by using the canvas category to generate an output image.

16. The non-transitory processor-readable storage medium according to claim 15, wherein loading the target information in the preview image data comprises:

setting a first background image by using the canvas category, the first background image comprising the preview image data; and displaying the target information on the first background image by using the canvas category.

17. The non-transitory processor-readable storage medium according to claim 15, wherein the second coordinate location of the target information in the target image data is calculated by:

calculating a relative location of the target information in the preview image data according to the first coordinate location of the target information in the preview image data; and calculating the second coordinate location of the target information in the target image data according to the relative location, the first length-width ratio, and the second length-width ratio.

* * * * *